United States Patent [19]

Busco

[11] 3,964,044

[45] June 15, 1976

[54] MULTIPLE OPERATING ALARM SYSTEMS EMPLOYING OIL BURNER FLAME MONITORING RELAYS

[76] Inventor: Anthony R. Busco, 15 Prospect St., Jamesburg, N.J. 08831

[22] Filed: Nov. 29, 1974

[21] Appl. No.: 527,953

[52] U.S. Cl. ............................... 340/276; 250/215; 340/227 R; 340/228 R; 340/419; 340/420; 431/79

[51] Int. Cl.² .................... G01D 21/04; G08B 13/10

[58] Field of Search ................ 340/420, 220, 227 R, 340/228 R, 274 R, 408, 409, 419, 276; 307/117; 317/124; 315/151, 156, 159; 250/215; 431/79

[56] References Cited

UNITED STATES PATENTS

| | | | |
|---|---|---|---|
| 3,430,052 | 2/1969 | Stephan | 317/124 |
| 3,540,043 | 11/1970 | Crosthwait | 340/420 |

*Primary Examiner*—John W. Caldwell
*Assistant Examiner*—James J. Groody
*Attorney, Agent, or Firm*—Arthur L. Plevy

[57] ABSTRACT

An alarm system uses a series string of sensors including burglar, fire and cold detectors in series with a relay coil. The coil when activated, assures that all sensors are indicating a no fault condition and a contact associated with the coil, energizes a source of light to illuminate a photo detector. Upon an intrusion, the coil is energized causing an alarm to activate, which alarm may cause another alarm to continue warning of a fault in spite of a predetermined reset condition, which may undesirably occur.

Other embodiments show a technique of monitoring a plurality of secured locations to determine the exact one experiencing a fault.

10 Claims, 3 Drawing Figures

Fig. 2.
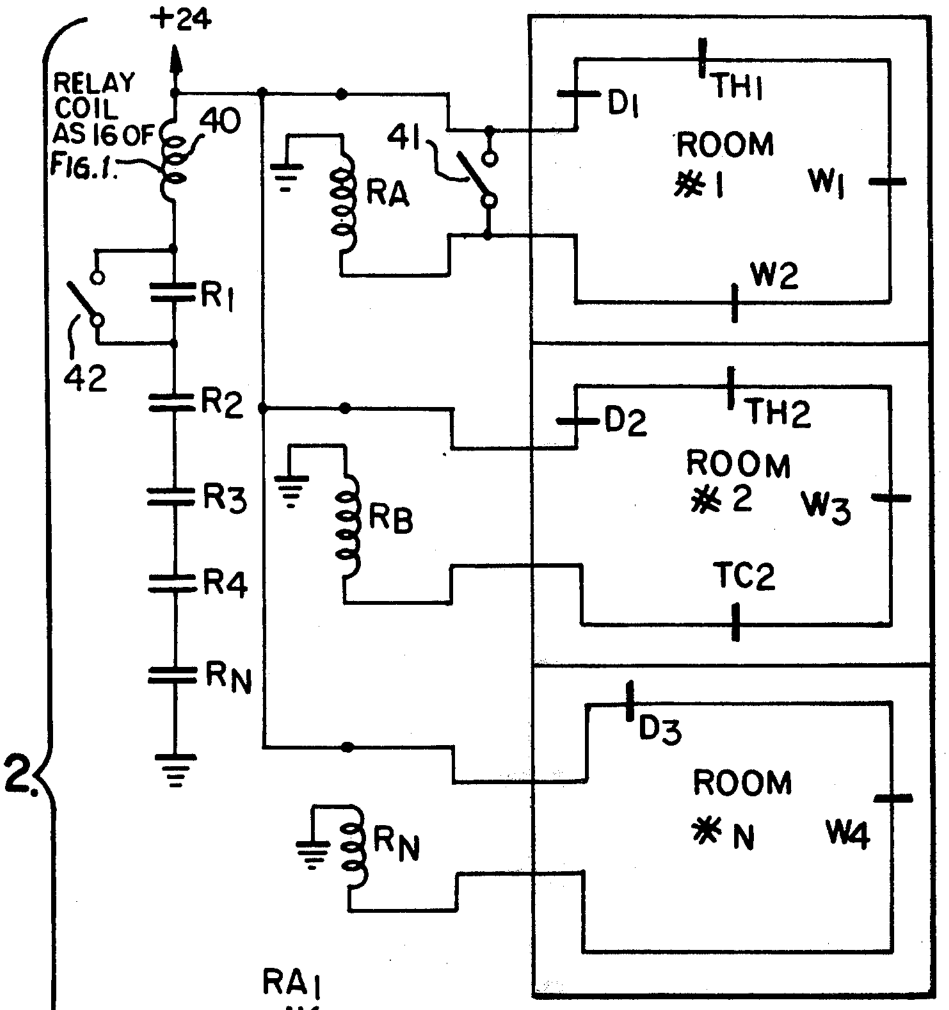
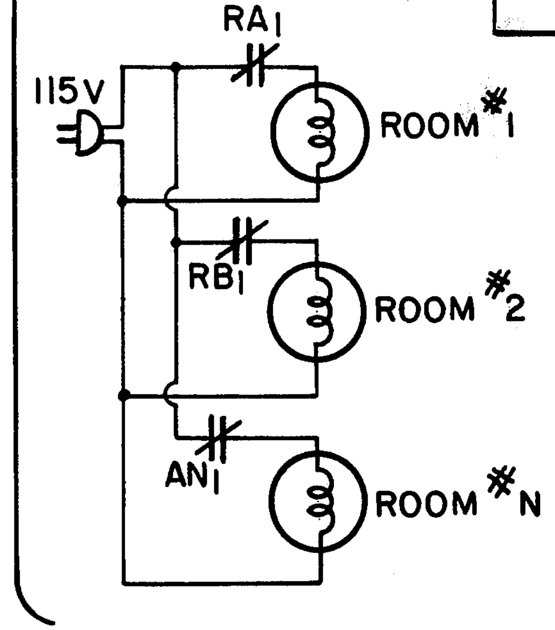
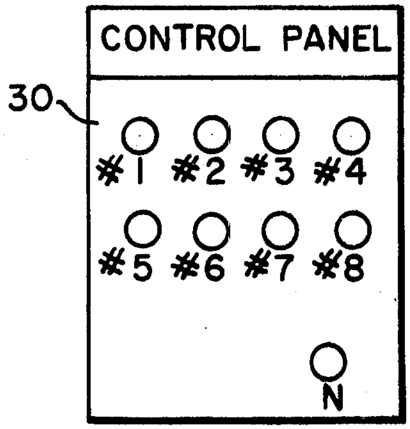
Fig. 3.

MULTIPLE OPERATING ALARM SYSTEMS EMPLOYING OIL BURNER FLAME MONITORING RELAYS

BACKGROUND OF INVENTION

This invention relates to a multiple alarm system to inform a user of the occurance of one of a number of undesireable events such as a burglary, fire or a low or high temperature condition.

The prior art is replete with a number of patents which are directed to fire, burglar and other alarm type systems to enable the supervision of areas to be monitored and to provide all sorts of alarms and indications to enable one to prevent damage or intrusion to an area to be protected.

Certain patents as U.S. Pat. No. 3,487,404 issued on Dec. 30, 1969 to T. C. Midkiff and entitled COMBINED FIRE ALARM, BURGLAR ALARM AND INTERCOMMUNICATION SYSTEM depicts various modes of operation of such systems. Others as U.S. Pat. No. 3,550,111 entitled SECURITY ALARM SYSTEM by H. D. Ervin on Dec. 22, 1970, describe common controls for security systems.

Many other patents exist as U.S. Pat. Nos. 3,441,129, 3,391,637, 2,444,925 and 1,440,743, which describe various apparatus and equipments operative to provide security and similar protection to an area to be monitored.

It is apparent that the need for such equipment is great and a multiple of such systems exist for the home, office and commercial and residential establishments.

A major problem with many such systems is that they require highly technical personnel to install, test and maintain such equipment. Certain other systems require complicated wiring schemes and are not easily adaptable to the adding of protection to additional areas after the system has been installed.

It is therefore an object of the present invention to provide a reliable and efficient security system capable of monitoring a number of different alarm conditions while being easy to install, maintain and operate. Thus allowing different technicians of varying capability to install and maintain the same.

BRIEF DESCRIPTION OF PREFERRED EMBODIMENT

A multiple alarm system for monitoring the status of an area to be protected comprising a series path sensor string including a relay coil in said path, said relay coil associated with at least a first contact, said contact capable of being in either one of two states, wherein in one of said states, said contact is closed and in said other state, said contact is opened; first illumination means coupled to said contact operative to provide a light beam when said coil is energized; light responsive means responsive to said light beam to detect a transition from dark to light to provide upon detection of said condition, an output signal of an indefinite duration, and operative upon detection of a light to dark condition to provide a predetermined duration signal, which signal will undesirably reset said light responsive means; time delay means responsive to said predetermined signal and operative after a delay less than said predetermined delay to provide an output signal before the termination of said predetermined delay; second illumination means responsive to said output signal of said time delay means to illuminate said light responsive means independent of said first means to thereby assure that said predetermined duration signal does not reset said light responsive means whereby when said series string is broken and said coil is no longer energized, said first light responsive means produces said indefinite duration signal, and alarm means responsive to said indefinite duration signal to provide an indication when said series sensor string is broken.

BRIEF DESCRIPTION OF DRAWINGS

FIG. 2 is a schematic diagram of a monitoring system for use with a security systems according to FIG. 1.

FIG. 3 is a front view of a control panel used with the monitoring systems of FIG. 2.

DETAILED DESCRIPTION OF DRAWING

Figure 1:
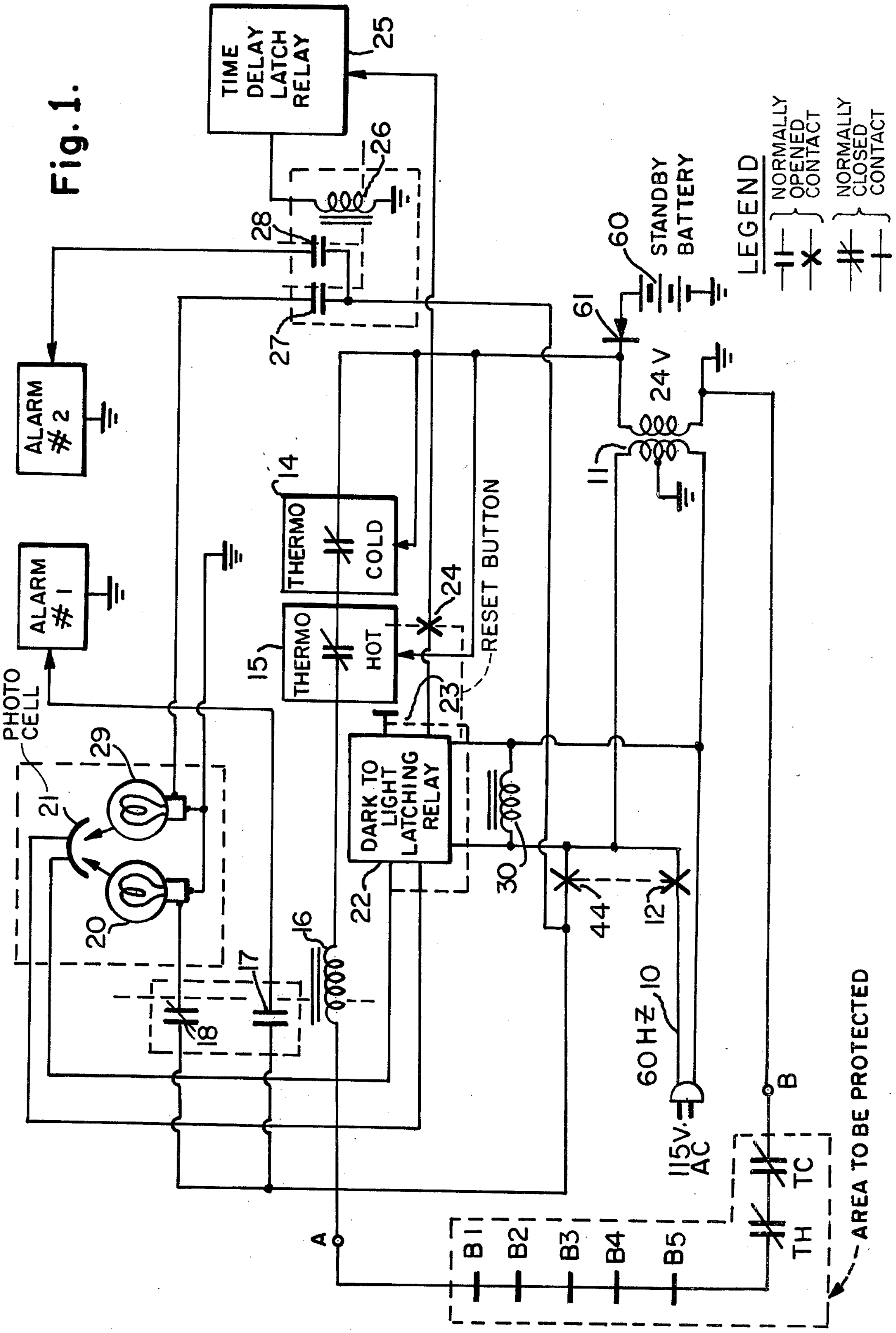
FIG. 1 is a schematic diagram partially in block form of a security system employing multiple alarm protection.

Before describing the figures in detail, it is indicated that all components used operate on either 115 volts AC or 24 volts AC. This is important in that both voltages as 115 and 24 specify a great number of components as relays, light-bulbs, thermostats and so on which are extensively used in household wiring systems. Such components are available from a number of manufacturers, such as General Electric, Honeywell and so on, and the typical heating-air conditioning installer, electrician and builder and so on are extremely familiar with both the operation and use of such components. Hence, all such persons can install and maintain the system to be described as well as the fact that replacement parts are available through any typical hardware or other store.

Therefore, one not need rely on manufacturers' replacement parts and so on, as well as the fact that any electrician or heating repair or service man can replace these system parts with a minimum of trouble and difficulty.

Referring to FIG. 1, there is shown a schematic diagram partially in block form of a security system according to the invention.

As seen, the system plugs into the 60 Hz AC line directly and is therefore powered by conventional AC current readily available to any user. The AC line 10 is coupled to the primary winding of a 24 volt transformer 11 through a switch 12.

The switch 12 may be a conventional wall switch as typically found in the home or other establishments. The switch 12 is mechanically coupled to another switch 44.

Operation is such that switch 12 must be closed to operate switch 44.

The operation of the switches 12 and 44 applies power to the system. Hence, with switch 12 closed, the transformer 11 is energized and a 24 volt AC signal appears at the secondary. As indicated above, 24 volts is a typically used power source for many household items as door bells, thermostats, relays and so on, as is 115 volts.

The system uses the series wiring approach to obtain mutiple protection. The secondary winding (24 volts) is applied to a series string including the thermostats 14 and 15 respectively labelled as hot and cold, the relay coil 16 and normal magnetic contacts as B1 to B5 which are used in present day systems to control door and window openings. Such switches are mercury, magnetic and so on and can be purchased as normally closed or normally opened. Hence, if an intruder opens a window or a door, a switch as B1 will open. The thermostats as 14 and 15 as well as those indicated as TH and TC are also conventional units. They can operate on 24 volts AC and when the temperature rises or falls below a present value, the thermostat will open or close depending on the type.

There are virtually a large number of such units available as switches and thermostats commercially available and a text entitled FIRE AND THEFT SECURITY SYSTEMS by Byron Wells (Tab Books), 1971) describes many suitable units.

The utilization of a series loop for protection is also well known and widely used.

Basically, a room or house to be protected is provided with detector or switches as B1 to B5. These are wired in series on or about windows, doors and so on by using thin wire or conducting tape or foil. One must also protect against fire, so a high temperature thermostat as 15 or TH is wired in series as well. One could also wire the contact of a smoke detector or another detector in series with the switches B1 to B5. A cold thermostat 14 is also shown and this contact will open if the temperature falls below a set value to protect refrigeration systems, or water pipes and so on.

Both types of thermostats are widely used and commercially available.

As can be ascertained from the figure, if all windows, doors and temperatures are proper, then all the contacts B1 to B5 as well as the thermostat 14 and 15 contacts are closed. The relay coil 16 is activated via the series path. Relay 16 has two contacts associated therewith and designated as 17 and 18. Thus contact 17 is opened if relay coil 16 is energized and contact 18 is closed.

Contact 18 is in series with a bulb 20, which may be a typical 115 volt bulb, such as one uses in a lighting fixture and could be a 40 watt or any type of ordinary household bulb. As long as relay 16 is operated, the bulb 20 is lit via contact 18. This can only occur if all the switch contacts B1 to B5 as well as the thermostat contacts are closed, indicating that the protected area as wired is secured. The bulb 20 illuminates a photocell sensor 21, having its input coupled to a dark to light latching relay 22.

Such relays as 22 are also standard and are used extensively in the heating field to monitor a furnace pilot light and operate when the light goes out. Such relays are manufactured by White Rodgers and Co., Honeywell and a host of others.

Basically, the relay operates as follows: When the photocell has light impinging on it, the relay 22 does not operate. If the lamp 20 goes off, the relay operates until the lamp comes on again and then the relay 22 latches and stays activated until it is reset via the reset button 23. Hence the relay 22 responds via the and photocell 21 which senses darkness first and then light and the relay 22 operates and stays operated until it is manually reset.

It is also noted that when the coil 16 is activated, contact 17 in series with the alarm No. 1 is opened and hence there is no alarm as long as the coil 16 is energized. The alarm 16 may be a bell, buzzer or siren operating from 24 volts AC or 115 volts AC. Many buzzers and alarms are available with such voltage ratings and any one desired can be used depending on the location of the system or the requirements of the user.

A contact 24 of relay 22 is in series with a time delay relay 25. A time delay relay as 25 is also a conventional, commercial component and operates to provide a given time delay before it latches or closes. The relay 25 after the time delay, will then activate another relay coil 26.

The coil 26 has contacts 27 and 28 associated therewith. When the coil 26 operates via the time delay relay 25, both contacts, 27 and 28 close. Contact 28 activates a second alarm No. 2, which can be similar to alarm No. 1, as having the same operating characteristics and qualities.

The contact 27 activates another lamp 29 which is placed close to lamp 20 and serves to illuminate the photocell 21 to provide back up protection as will be explained.

DESCRIPTION OF OPERATION

As indicated, if all switches and thermostats are closed, no alarm can operate and the premises are secure. Assume now, that an intruder enters a protected area via a door, which door is protected by the switch B1. Also assume that he immediately closes the door after gaining access to the premises.

Since B1 opens, the relay coil 16 loses power and contact 17 goes to the normally closed position and alarm No. 1 is activated momentarily. Also the lamp 20 is turned off since contact 18 opens. The detector 21 sees the change from light to dark, and relay 22 closes contact 24. If the door was left open, the alarm No. 1 would continue. Hence, the intruder may hear alarm No. 1 and leave or he may close the door rapidly and enter the premises. As soon as the door is closed, B1 closes and relay 16 again is activated. Alarm No. 1 goes off via contact 17, but lamp 20 goes on via contact 18. Thus the relay 22 responsive to a charge from dark to light latches via its coil 30 in series with the light to dark sensing element 21. The relay 22 cannot be inactivated unless one depresses switch 23 to deenergize the coil 30.

When light 20 goes off, the contact 24 closes and the time delay relay 25 is energized. The time delay relay 25 can be set to any desired delay. After the set delay, relay 25 closes and operates relay 26, which now activates alarm No. 2, as well as bulb 29 via contacts 27 and 28. This condition assures a full alarm and occurs for the opening and closing of a door or a window; as relay 22 became latched and has to be manually reset. Thus, if an intruder opens a window or a door and then closes it, the system is automatically set after a predetermined time via the time delay relay 25.

Alternatively, if the temperature in a room exceeds the setting of the HOT thermostat 15 or falls below the COLD thermostat 14, the relay coil 16 drops out and the alarm No. 1 is activated. Hence for a fire or a thermostat reading, it is again noted that both alarms one and two will sound.

It was also noted that operation of the time delay relay 25 causes an additional lamp 29 to be energized. This is necessary because of the nature of the relay 22; as indicated is the type used in an oil burner or other furnace and operates to monitor the presence of a flame in the combustion chamber. The commercially available relays as 22 have a built-in safety. The relay 22, as indicated, operates and locks when the electric eye 21 "sees" a condition of darkness first and then light. This feature is to prevent oil from pouring into the burner unnecessarily.

So the relay 22 will automatically reset after a predetermined period, if it does not see light again. A contact as 24 on that relay 22 is immediately closed when the eye 21 sees the transition from light to dark and this contact stops oil flow in a burner.

However, if it does not see light, one would desire the oil to stop flowing. The time delay relay 25 has less delay than the safety delay of relay 22. Therefore, light 29 goes on and guarantees that the relay 22 must see light again to cause it to permanently latch. Since the contact 24 of relay 22 operates immediately, it assures that the safety feature of relay 22 is circumvented and assures that the electric eye 21 must see light again to latch the same.

Referring to FIG. 2, there is shown a schematic diagram utilizing the alarm apparatus of FIG. 1 and capable of displaying and monitoring the status of any one of a number of different areas to be protected, as rooms in a hotel, motel, apartment building, offices and so on.

As indicated in FIG. 1, the relay coil 16 is in series with all switch detectors and thermostats and so on and the operation of the system has been explained.

In FIG. 2, a relay coil 40, (as 16 of FIG. 1) is in series with a plurality of normally opened contacts R1 to RN. Each contact as R1 to RN is indicative of one room or one area, or one location of protected premises.

For example, contact R1 is activated by relay coil RA. Coil RA is energized via a series string of sensors, labelled D1 for a door of Room 1, TH1, for a fire detector of Room 1 and W1 and W2 for window switches in Room No. 1.

Therefore, if all sensor switches are closed, relay RA is operated via the 24 volt series connection and contact R1 is closed.

Similarly, all the other rooms have associated relays as RB and RN which correspond to contacts R2 and RN. Other rooms or areas (not shown) have relays that operate contacts as R3 and R4.

Hence if all rooms are secured, relay coil 40 is activated via the series path afforded by contacts R1 to RN.

Since relay 40 is closed, then the lamp of the burglar system (20 of FIG. 1) is on and the system provides no alarm.

Each relay as RA, RB and RN also have another contact as RA1, RB1, and RN1. These contacts are normally closed and are in series with an individual lamp for each room.

The lamps are designated as Room No. 1, Room No. 2, and Room No. N and are located on a master control panel 50 of FIG. 3.

Since when a room is secured, the relay associated is activated, then all lamps are off.

Now assume an intruder or a fire occurs in Room No. 1. The 24 volt supply to relay coil RA is broken and the relay coil is inactivated. Hence contact R1 opens and relay 40 is deenergized. Thus the alarm sequence of FIG. 1 begins.

As soon as relay coil RA is inactivated, the contact RA1 closes and lamp (Room No. 1) is activated immediately displaying to a security guard who is viewing the panel 50, that there is trouble in room No. 1. It will be noted that if multiple intrusions or fires occur, all rooms affected will be shown on the panels as the contacts as RB1 and RN1 will also light the respective lamps when the coils as RB and RN lose power.

Also shown are switches 41 and 42. These switches serve to short out a relay coil or a contact to enable any room or area to be eliminated from surveillance by the operator, if so desired.

Hence a motel keeper or a hotel keeper can charge for the security service or one need not monitor a room if it is not considered necessary.

It is also shown that the system can accommodate any number of areas as well as additional areas can be wired and added on to the system with a minimum of difficulty.

Thus a security system has been described using easy obtainable components, single wiring and easy maintenance and operation.

It is also understood that while AC operation is shown, that one could use battery standby as for the 24 volt supply and hence, failure of power will still cause the system to operate.

The battery (FIG. 1) 60 is charged and the diode 61 keeps the battery off the line when AC is available and the battery voltage is higher than the line. When power fails, the relay 22 can also be supplied for 24 volt operation as can the alarms and so on.

I claim:

1. A multiple alarm system for monitoring the status of an area to be protected, comprising:

a. a series path sensor string including a relay coil in said path, said relay coil associated with at least a first contact, said contact capable of being in either one of two states; wherein is one of said states, said contact is closed and in said other state, said contact is opened, b. first illumination means coupled to said contact and said illumination means operative to provide a light beam, when said coil is energized, c. light responsive means responsive to said light beam to detect a transition from dark to light to provide upon detection of said condition, an output signal of an indefinite duration and operative upon detection of a light to dark condition to provide a predetermined duration signal, which signal will undesireably reset said light responsive means, d. time delay means responsive to said predetermined signal and operative after a delay less then said predetermined duration signal to provide an output signal before the termination of said predetermined delay, e. second illumination means responsive to said output signal of said time delay means to illuminate said light responsive means independent of said first illumination means to thereby assure that said predetermined duration signal does not reset said light responsive means whereby when said series string is broken and said coil is no longer energized, said light responsive means produces said indefinite duration signal, and f. alarm means responsive to said indefinite duration signal to provide an indication when said series sensor string is broken.

2. The alarm system according to claim 1 wherein said series sensor string includes a switch sensor of the type used to monitor the status of a door or window.

3. The alarm system according to claim 1 wherein said series sensor string includes a high temperature thermostat.

4. The alarm system according to claim 3 wherein said series sensor string includes a low temperature thermostat.

5. The alarm system according to claim 1 wherein said series sensor string includes a series of contacts each one indicative of the status of a selected different one of a plurality of areas to be protected.

6. The alarm system according to claim 1 wherein said relay coil is associated with a second contact, said second contact being in a state opposite to that of said first contact and second alarm means operative to provide a warning signal when said series string is broken and therefore when said coil is deenergized.

7. The alarm system according to claim 1 wherein said relay coil, said illumination means and said alarm means are all operative from a source of AC potential.

8. The alarm system according to claim 1 further including reset means coupled to said light responsive means for disabling said indefinite duration signal.

9. The alarm system according to claim 1 wherein said first and second illumination means are conventional light bulbs.

10. The alarm system according to claim 1 wherein said alarm means is an audible alarm activated by a source of AC potential.

* * * * *